(12) United States Patent
White

(10) Patent No.: US 11,261,917 B2
(45) Date of Patent: Mar. 1, 2022

(54) METHOD OF MANUFACTURING A SHRINK-FIT JOINT

(71) Applicant: GM GLOBAL TECHNOLOGY OPERATIONS LLC, Detroit, MI (US)

(72) Inventor: Daniel R. White, Fenton, MI (US)

(73) Assignee: GM Global Technology Operations LLC, Detroit, MI (US)

(*) Notice: Subject to any disclaimer, the term of this patent is extended or adjusted under 35 U.S.C. 154(b) by 277 days.

(21) Appl. No.: 16/656,076

(22) Filed: Oct. 17, 2019

(65) Prior Publication Data
US 2021/0115975 A1 Apr. 22, 2021

(51) Int. Cl.
| | | |
|---|---|---|
| *B23P 11/02* | (2006.01) | |
| *F16D 1/068* | (2006.01) | |
| *F16D 1/027* | (2006.01) | |
| *B23P 11/00* | (2006.01) | |
| *H05B 6/10* | (2006.01) | |
| *B23P 17/02* | (2006.01) | |

(52) U.S. Cl.
CPC .............. *F16D 1/068* (2013.01); *B23P 11/00* (2013.01); *B23P 11/025* (2013.01); *F16D 1/027* (2013.01); *H05B 6/10* (2013.01); *B23P 11/005* (2013.01); *B23P 17/02* (2013.01); *F16D 2250/0061* (2013.01); *Y10T 29/49865* (2015.01)

(58) Field of Classification Search
CPC ....... B23P 11/005; B23P 11/025; B23P 17/02; Y10T 29/49865; F16D 2250/0061
See application file for complete search history.

(56) References Cited

U.S. PATENT DOCUMENTS

| | | | |
|---|---|---|---|
| 3,879,828 A * | 4/1975 | Troost | B21B 27/03 |
| | | | 29/895.212 |
| 4,773,655 A | 9/1988 | Lummila et al. | |
| 5,093,974 A | 3/1992 | Ginzburg | |
| 2008/0231042 A1* | 9/2008 | Brayman | B23P 11/025 |
| | | | 285/41 |
| 2016/0084282 A1* | 3/2016 | Gainor | B23P 11/025 |
| | | | 29/447 |

FOREIGN PATENT DOCUMENTS

WO      WO9748914 A1    12/1997

* cited by examiner

*Primary Examiner* — Jermie E Cozart
(74) *Attorney, Agent, or Firm* — Quinn IP Law

(57) ABSTRACT

A method for manufacturing a torque-transmitting assembly includes turning an inner component and machining an outermost surface of the inner component such that the outermost surface of the inner component has a continuous convex shape. The method further includes turning an external component and machining an innermost surface of the external component such that the innermost surface of the external component has a continuous convex shape. The method also includes heating the innermost surface of the external component to expand a size of the innermost surface after machining the innermost surface of the external component and placing the heated external component onto the inner component while the inner component is maintained at room temperature.

16 Claims, 4 Drawing Sheets

METHOD OF MANUFACTURING A SHRINK-FIT JOINT

INTRODUCTION

The present disclosure relates to shrink-fit joints, and a method of a manufacturing shrink-fit joints.

Joints are used to connect to rotational parts. Shrink-fit joints are sometimes used to couple to rotational parts. It is, however, desirable, to develop a joint that is capable of resisting higher torques.

SUMMARY

The present disclosure describes highly precise turning and grinding methods to produce the required convex/convex form on 2 rotational parts. The external component is then heated to grow the inner diameter. The inner component is positioned inside the external component, and both components are shrink fitted together to form one part. This method results in a higher torque joint for rotational parts in, for example, a transmission, engine, or electrification drive unit.

In an aspect of the present disclosure, the method for manufacturing a torque-transmitting assembly includes the following steps: turning an inner component about a first longitudinal axis, wherein the first longitudinal axis extends along the inner component; (b) machining an outermost surface of the inner component such that the outermost surface of the inner component has a continuous convex shape; (c) turning an external component about a second longitudinal axis, wherein the second longitudinal axis extends along the external component; (d) machining an innermost surface of the external component such that the innermost surface of the external component has a continuous convex shape; (e) heating the innermost surface of the external component to expand a size of the innermost surface after machining the innermost surface of the external component; (f) placing the heated external component onto the inner component while the inner component is maintained at room temperature; and (g) holding the inner component and the external component in place until an interface between the innermost surface of the external component and the outermost surface of the inner component reaches the room temperature after placing the heated external component onto the inner component to complete a shrink-fit joint, thereby maximizing a transmitting torque of the interface between the innermost surface of the external component and the outermost surface of the inner component.

Machining the outermost surface of the inner component may include grinding the outermost surface of the inner component. Grinding the outermost surface of the inner component may include placing a grinding wheel in direct contact with the outermost surface of the inner component and rotating the grinding wheel while the inner component is turned about the first longitudinal axis and while the grinding wheel is in direct contact with the outermost surface of the inner component. The innermost surface of the external component defines an opening extending through the external component.

Machining the innermost surface of the external component may include grinding the innermost surface of the external component. The grinding wheel may be referred to as the first grinding wheel. A second grinding wheel may be inserted inside the opening of the external component. The second grinding tool may be placed in direct contact with the innermost surface of the external component and rotated while the external component is turned about the second longitudinal axis and while the second grinding wheel is in direct contact with the innermost surface of the external component. The method may further include removing the second grinding wheel from the opening of the external component after grinding the innermost surface of the external component.

To heat the innermost surface of the external component, an induction heating coil may be placed inside the opening of the external component. An alternating current (AC) may be supplied to the induction heating coil to produce heat. The innermost surface of the external component may be heated with a heating system, which may be an induction heating system. The heating system may include a power supply configured to supply the AC. The heating system may further include the induction heating coil. The induction heating coil may be coupled to the power supply such that the induction heating coil is configured to receive the AC from the power supply. The induction heating coil may be rotated inside the opening to uniformly heat the innermost surface of the external component. The induction heating coil may be removed from the opening of the external component.

The heated external component may be placed onto the inner component while the inner component is maintained at the room temperature after removing the induction heating coil from the opening of the external component. The heated external component may be placed onto the inner component while the inner component is in a vertical orientation. The room temperature is between sixty-eight degrees Fahrenheit and seventy-two degrees Fahrenheit.

The present disclosure also describes a torque-transmitting assembly. The torque-transmitting assembly includes an inner component, an external component disposed around the inner component and a shrink-fit joint interconnecting the external component and the inner component. The shrink-fit joint includes an outermost surface of the inner component and an innermost surface of the external component. The innermost surface of the external component is in direct contact with the outermost surface of the inner component. Each of the outermost surface and the innermost surface has a continuous convex shape. The external component defines an opening. The inner component may be entirely disposed inside the opening of the external component. The inner component may have a cylindrical shape. The external component may have a cylindrical shape.

The above features and advantages, and other features and advantages, of the present teachings are readily apparent from the following detailed description of some of the best modes and other embodiments for carrying out the present teachings, as defined in the appended claims, when taken in connection with the accompanying drawings.

DETAILED DESCRIPTION

The following detailed description is merely exemplary in nature and is not intended to limit the application and uses. Furthermore, there is no intention to be bound by expressed or implied theory presented in the preceding introduction, summary or the following detailed description.

Embodiments of the present disclosure may be described herein in terms of functional and/or logical block components and various processing steps. It should be appreciated that such block components may be realized by a number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with a number of systems, and that the systems described herein are merely exemplary embodiments of the present disclosure.

For the sake of brevity, techniques related to signal processing, data fusion, signaling, control, and other functional aspects of the systems (and the individual operating components of the systems) may not be described in detail herein. Furthermore, the connecting lines shown in the various figures contained herein are intended to represent examples of functional relationships and/or physical couplings between the various elements. It should be noted that alternative or additional functional relationships or physical connections may be present in an embodiment of the present disclosure.

Figure 1:
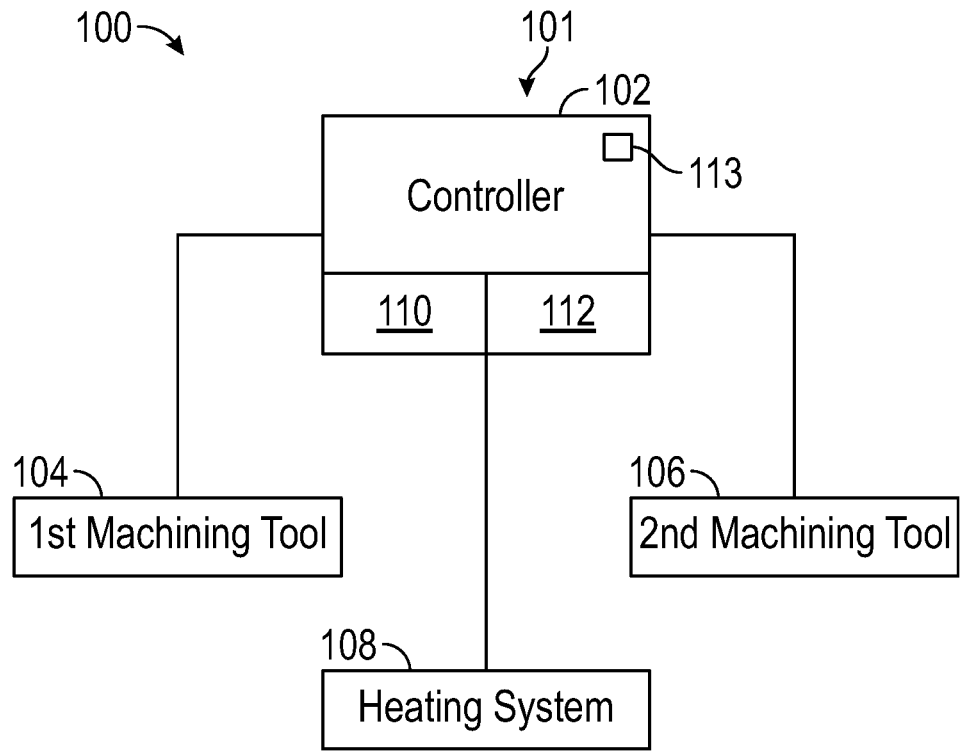
FIG. 1 is a schematic diagram of a manufacturing system.

With reference to FIG. 1, a manufacturing system 100 includes a controller 102, a first machining tool 104, a second machining tool 106, and a heating system 108. Each of the first machining tool 104, the second machining tool 106, and the heating system 108 is in electronic communication with the controller 102. As such, the controller 102 is configured to control the operation of the first machining tool 104, the second machining tool 106, and the heating system 108. While the drawings show a single controller 102, it is envisioned that the manufacturing system 100 may include more than one controller 102.

The controller 102 includes at least one processor 110 and a computer non-transitory readable storage device or media 112. The processor 110 may be a custom made or commercially available processor, a central processing unit (CPU), a graphics processing unit (GPU), an auxiliary processor among several processors associated with the controller 102, a semiconductor-based microprocessor (in the form of a microchip or chip set), a macroprocessor, a combination thereof, or generally a device for executing instructions. The computer readable storage device or media may include, for example, volatile and nonvolatile storage in read-only memory (ROM), random-access memory (RAM), and keep-alive memory (KAM). KAM is a persistent or non-volatile memory that may be used to store various operating variables while the processor 110 is powered down. The computer-readable storage device or media 112 may be implemented using a number of memory devices such as PROMs (programmable read-only memory), EPROMs (electrically PROM), EEPROMs (electrically erasable PROM), flash memory, or another electric, magnetic, optical, or combination memory devices capable of storing data, some of which represent executable instructions, used by the controller 102 in controlling the first machining tool 104, the second machining tool 106, and/or the heating system 108. The controller 102 further includes a user interface 113 configured to receive commands from a user. The user interface 113 may include, for example, buttons, a touch-screen, knobs, a keyboard, or a combustion thereof. As such, the user may select a specifics Geometric Dimensioning and Tolerancing (GD&T) callout to through the user interface 113. In response to this selection, the controller 102 commands the first machining tool 104, the second machining tool 106, or both, to perform a specific action. The controller 102, the first machining tool 104, and/or the second machining tool 106 may be part of a computer numerical control (CNC) machine 101.

Figure 2:
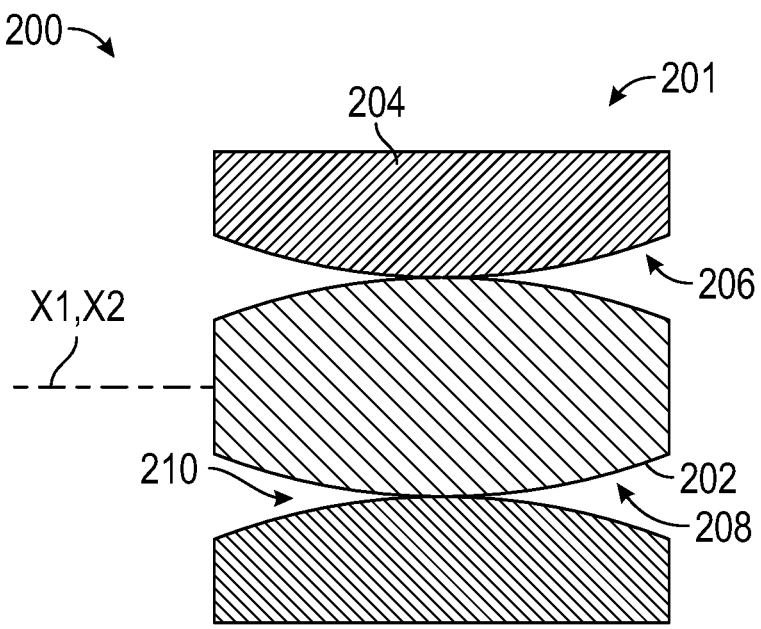
FIG. 2 is a schematic sectional view of a shrink-fit joint between an inner component and an external component.

With reference to FIG. 2, the manufacturing system 100 (FIG. 1) may be used to manufacture a shrink-fit joint 200 between an inner component 202 and an external component 204. The inner component 202 and the external component 204 collectively form a torque-transmitting assembly 201 when coupled together through the shrink-fit joint 200. The external component 204 has an innermost surface 206, and the inner component 202 has an outermost surface 208. Each of the innermost surface 206 of the external component 204 and the outermost surface 208 of the inner component 202 has a convex form (i.e. a continuous convex shape) after the manufacturing method 300 (shown in FIG. 3) has been completed. The innermost surface 206 of the external component 204 is in direct contact with the outermost surface 208 of the inner component 202 to maximize the torque-transmitting capabilities of the shrink-fit joint 200. Each of the inner component 202 and the external component 204 is wholly or partly made of a rigid material, such as metal or a rigid polymer). The inner component 202 extends along a first longitudinal axis X1. The external component 204 extends along a second longitudinal axis X2. The first longitudinal axis X1 and the second longitudinal axis X2 may be parallel to each other. For instance, the external component 204 may be coaxial with the inner component 202. The innermost surface 206 of the external component 204 defines an opening 210 extending through the external component 204. Each of the inner component 202 and the external component 204 may have cylindrical shapes to maximize the torque-transmitting capabilities of the shrink-fit joint 200 of the torque-transmitting assembly 201.

Figure 3:
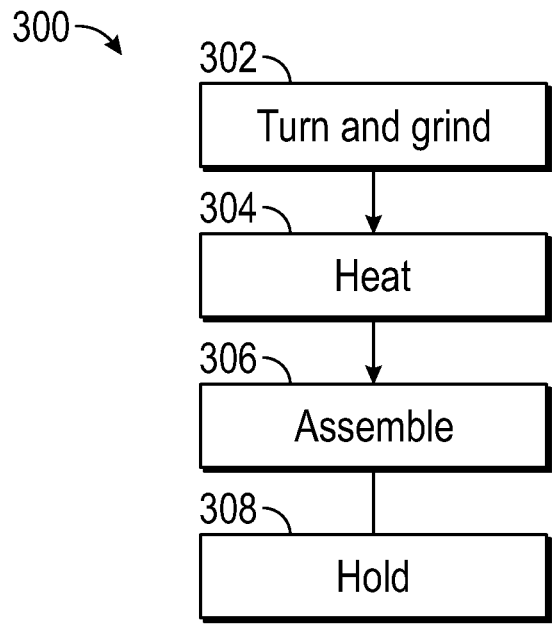
FIG. 3 is a flowchart of a method of manufacturing the shrink-interface of FIG. 2.

FIG. 3 is a flowchart of a method 300 of manufacturing the shrink-fit joint 200 of the torque-transmitting assembly 201. The method 300 may be controlled through the controller 102 and begins at block 302 in response to a selection of a GD&T callout by a user through the user interface 113. The GD&T callout may be a Profile of a Line. At block 302, the inner component 202 is turned about the first longitudinal axis X1. In other words, the inner component 202 is rotated about the first longitudinal axis X1. Then, the outermost surface 208 of the inner component 202 is machined using the first machining tool 104, at the same time as the inner component 202 is turned about the longitudinal axis X1, until the outermost surface 208 has a continuous convex shape as shown in FIG. 2. The controller 102 may be programmed to control the first machining tool 104.

Figure 4:
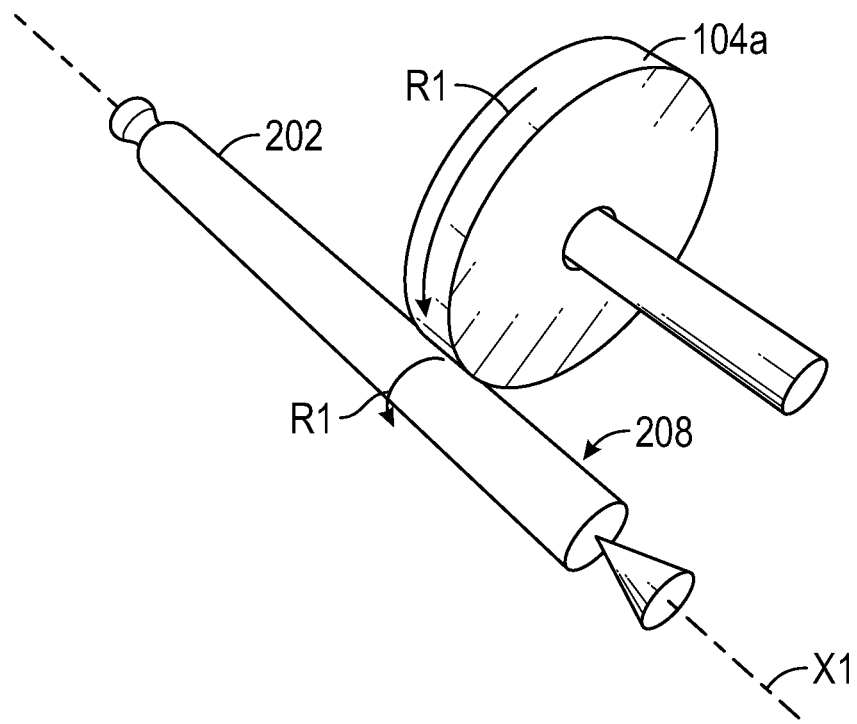
FIG. 4 is a schematic perspective view of a first grinding wheel grinding the inner component of FIG. 2.

As shown in FIG. 4, the first machining tool 104 may be a first grinding wheel 104a and therefore the machining process described with respect to block 302 may be grinding. To form the continuous convex shape on the outermost surface 208 of the inner component, the first grinding wheel 104a is placed in direct contact with the outermost surface 208 of the inner component 202 at the same time as the inner component 202 is turned about the first longitudinal axis X1 in a first rotational direction R1 (e.g., counterclockwise). While the first grinding wheel 104a is in direct contact with the outermost surface 208 of the inner component 202, the first grinding wheel 104a is rotated in the same first rotational direction R1 (e.g., counterclockwise) while the inner component 202 is rotated about the first longitudinal axis X1 in the first rotational direction R1 to grind the outermost surface 208 until the outermost surface 208 has a continuous convex shape.

With reference again to FIG. 3, at block 302, the external component 204 is turned about the second longitudinal axis X2 in the first rotational direction R1 (e.g., counterclockwise). In other words, the external component 204 is rotated about the first rotational direction R1. Then, the innermost surface 206 of the external component 204 is machined using the second machining tool 106 (at the same time as the external component 204 is rotated about the second longitudinal axis X2) until the innermost surface 206 of the external component 204 has a continuous convex shape. The controller 102 may be programmed to control the second machining tool 106.

Figure 5:
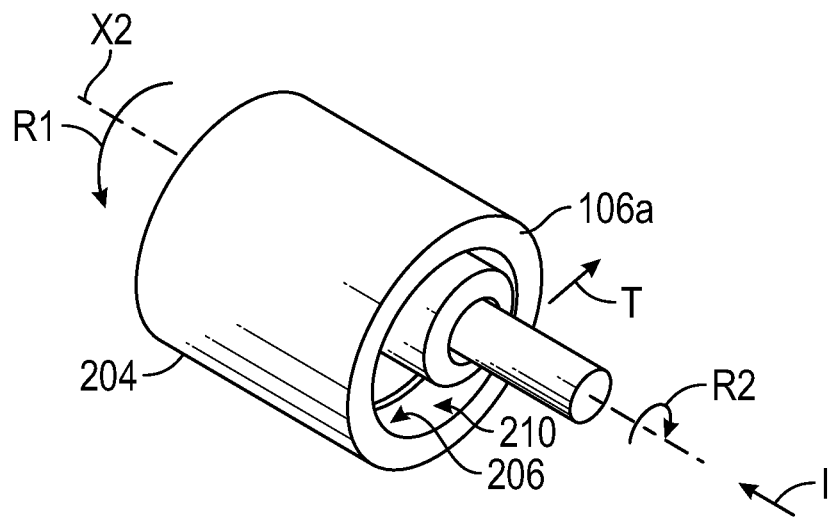
FIG. 5 is a schematic perspective view of a second grinding wheel grinding the external component of FIG. 2.

With reference to FIG. 5, as discussed above, the innermost surface 206 of the external component 204 defines the opening 210 that extends along the second longitudinal axis X. The second machining tool 106 may be a second grinding wheel 106a and therefore the machining process described above may be grinding. To form the continuous convex shape on the innermost surface 206 of the external component 204, the second grinding wheel 106a is inserted inside the opening 210 of the external component 204 as indicated by arrow I and moved in a traverse direction T until the second grinding wheel 106a is in direct contact with the innermost surface 206 of the external component 204. The second grinding wheel 106a is placed in direct contact with the innermost surface 206 of the external component 204 at the same time as the external component 204 is rotating about the second longitudinal axis X2 in the first rotational direction R1. Also, the second grinding wheel 106a is also rotated about the second longitudinal axis X2 in a second rotational direction R2 (which is opposite to the first rotational direction R1) at the same time as: (a) the second grinding wheel 106a is turning about the second longitudinal axis X2 in the first direction R2; and (b) the second grinding wheel 106a is in direct contact with the innermost surface 206 of the external component 204 to grind the innermost surface 206 until the innermost surface 206 has a continuous convex shape. The rotational movement of the second grinding wheel 106a about the second longitudinal axis X2 maintains the second grinding wheel 106a in direct contact with the innermost surface 206 of the external component 204. Then, the second grinding wheel 106a is removed from the opening 210 of the external component 204, and the method 300 proceeds to block 304. Each of the first grinding wheel 104a and the second grinding wheel 106a has the respective controlled form (e.g., the respective convex shape) that is dressed into the grinding wheel (i.e., the respective first grinding wheel 104a or the second grinding wheel 106a) for optimized control of each component (i.e., the respective external component 204 or the inner component 202).

With reference again to FIG. 3, block 304 entails heating the innermost surface 206 of the external component 204 to enlarge the innermost surface 206. As a result of the heating, the innermost surface 206 of moves closer to the second longitudinal axis X2 when compared to its location before heating. To heat the innermost surface 206 of the external component 204, the heating system 108 may be used. The heating system 108 may be an induction heating system that is in commutation with the controller 102. Accordingly, the controller 102 may be programmed to control the heating system 108. The heating system 108 includes a power supply 114 configured to supply an alternating current (AC). In addition, the heating system 108 includes an induction heating coil 116 coupled to the power supply 114. As such, the induction heating coil 116 is configured to receive the AC from the power supply 114.

Figure 6:
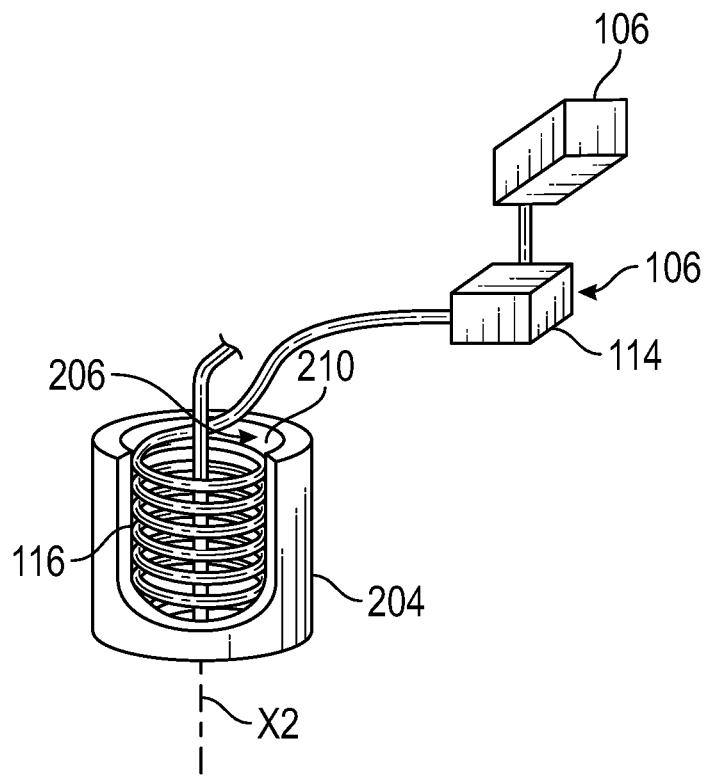
FIG. 6 is a schematic perspective view of a heating system coupled to a controller.
Figure 7:
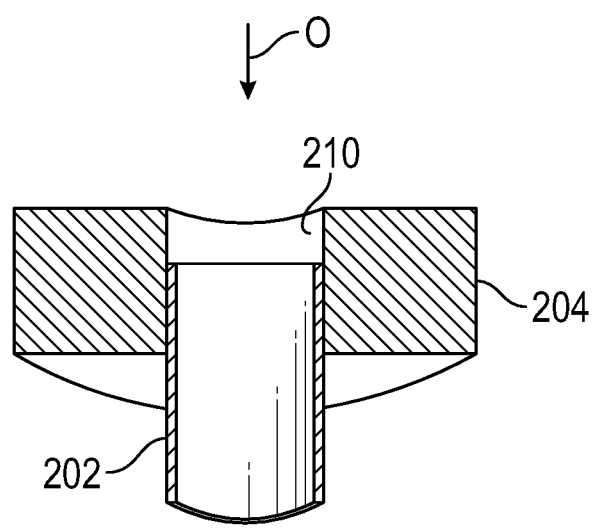
FIG. 7 is a schematic front view of the external component of FIG. 2 being placed onto the inner component.

With continued reference to FIGS. 3 and 6, at block 304, the induction heating coil 116 is placed inside the opening 210 of the external component 204 while leaving a gap between the innermost surface 206 of the external component 204 and the induction heating coil 116. The controller 102 may then be used to command the power supply 114 to supply an AC to the induction heating coil 116 to produce heat inside the external component 204. The induction heating coil 116 may be rotated inside the opening 210 about the second longitudinal axis X2 to uniformly heat the innermost surface 206 of the external component 204, thereby maximizing the torque-transmitting capabilities of the shrink-fit joint 200 after the thermal expansion of the innermost surface 206. After heating the innermost surface 206, the induction heating coil 116 is removed from the opening 210 of the external component 204. After block 304, the method 300 proceeds to block 306.

With reference to FIG. 3, block 306 entails assembling the external component 204 onto the inner component 202. Specifically, the heated (expanded) external component 204 is placed onto the inner component 202 (as indicated by arrow O) while the inner component 202 is maintained at room temperature to prevent thermal expansion of the inner component 202. In the present disclosure, the term "room temperature" means a temperature that between 68° Fahrenheit and 72° Fahrenheit. A vertical fixture may be used in this process. As such, the external component 204 is placed vertically onto the inner component 202 as indicated by arrow O to facilitate assembly of the external component 204 onto the inner component 202. The method 300 then proceeds to block 308.

With continued reference to FIG. 3, block 308 entails holding the inner component 202 and the external component 204 in place until an interface between the innermost surface 206 of the external component 204 and the outermost surface 208 of the inner component 202 reaches room temperature to complete the shrink-fit joint 200. The resulting shrink-fit joint 200 of the torque-transmitting assembly 201 is capable of transmitting higher torque than a shrink-fit joint that either has two straight contacting surfaces or a combination of a concave and convex contacting surface. For instance, the shrink-fit joint 200 is capable of transmitting 16% higher torque than a shrink-fit joint defined by two straight contacting surfaces.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

What is claimed is:
1. A method for manufacturing a torque-transmitting assembly, comprising:

turning an inner component about a first longitudinal axis, wherein the first longitudinal axis extends along the inner component;

machining an outermost surface of the inner component such that the outermost surface of the inner component has a continuous convex shape;

turning an external component about a second longitudinal axis, wherein the second longitudinal axis extends along the external component;

machining an innermost surface of the external component such that the innermost surface of the external component has a continuous convex shape;

heating the innermost surface of the external component to expand a size of the innermost surface after machining the innermost surface of the external component;

placing the heated external component onto the inner component while the inner component is maintained at room temperature; and holding the inner component and the external component in place until an interface between the innermost surface of the external component and the outermost surface of the inner component reaches the room temperature after placing the heated external component onto the inner component to complete a shrink-fit joint, thereby maximizing a transmitting torque of the interface between the innermost surface of the external component and the outermost surface of the inner component.

2. The method of claim 1, wherein machining the outermost surface of the inner component includes grinding the outermost surface of the inner component.

3. The method of claim 2, wherein grinding the outermost surface of the inner component includes placing a grinding wheel in direct contact with the outermost surface of the inner component and rotating the grinding wheel while the inner component is turned about the first longitudinal axis and while the grinding wheel is in direct contact with the outermost surface of the inner component.

4. The method of claim 3, wherein the innermost surface of the external component defines an opening extending through the external component.

5. The method of claim 4, wherein machining the innermost surface of the external component includes grinding the innermost surface of the external component, the grinding wheel is a first grinding wheel, grinding the innermost surface of the external component includes inserting a second grinding wheel inside the opening of the external component, grinding the innermost surface of the external component includes placing the second grinding wheel in direct contact with the innermost surface of the external component and rotating the second grinding wheel while the external component is turned about the second longitudinal axis and while the second grinding wheel is in direct contact with the innermost surface of the external component.

6. The method of claim 5, further comprising removing the second grinding wheel from the opening of the external component after grinding the innermost surface of the external component.

7. The method of claim 6, wherein heating the innermost surface of the external component includes placing an induction heating coil inside the opening of the external component.

8. The method of claim 7, wherein heating the innermost surface of the external component includes further includes supplying an alternating current (AC) to the induction heating coil to produce heat.

9. The method of claim 8, wherein the innermost surface of the external component is heated with a heating system, wherein the heating system is an induction heating system, and the induction heating system includes the induction heating coil.

10. The method of claim 9, wherein the heating system includes a power supply configured to supply the AC.

11. The method of claim 10, wherein the heating system further includes the induction heating coil, and the induction heating coil is coupled to the power supply such that the induction heating coil is configured to receive the AC from the power supply.

12. The method of claim 11, wherein heating the innermost surface of the external component further includes rotating the induction heating coil inside the opening to uniformly heat the innermost surface of the external component.

13. The method of claim 12, further comprising removing the induction heating coil from the opening of the external component.

14. The method of claim 13, wherein the heated external component is placed onto the inner component while the inner component is maintained at the room temperature after removing the induction heating coil from the opening of the external component.

15. The method of claim 14, wherein the heated external component is placed onto the inner component while the inner component is in a vertical orientation.

16. The method of claim 15, wherein the room temperature is between sixty-eight degrees Fahrenheit and seventy-two degrees Fahrenheit.

* * * * *